(12) United States Patent
Peteri

(10) Patent No.: US 8,444,184 B2
(45) Date of Patent: May 21, 2013

(54) CONDUIT STRUCTURE FOR A HOT WATER TAP, AS WELL AS SUCH TAP

(75) Inventor: Niels Theodoor Peteri, Rotterdam (NL)

(73) Assignee: Henri Peteri Beheer B.V., Ridderkerk (NL)

( * ) Notice: Subject to any disclaimer, the term of this patent is extended or adjusted under 35 U.S.C. 154(b) by 28 days.

(21) Appl. No.: 13/131,624

(22) PCT Filed: Dec. 8, 2009

(86) PCT No.: PCT/NL2009/050746
§ 371 (c)(1),
(2), (4) Date: May 27, 2011

(87) PCT Pub. No.: WO2010/068097
PCT Pub. Date: Jun. 17, 2010

(65) Prior Publication Data
US 2011/0233921 A1    Sep. 29, 2011

(30) Foreign Application Priority Data
Dec. 8, 2008   (NL) ..................................... 2002303

(51) Int. Cl.
*F16L 27/00*       (2006.01)
(52) U.S. Cl.
USPC ............ 285/276; 285/321; 285/403; 285/374
(58) Field of Classification Search
USPC ................ 285/276, 277, 321, 256, 403, 400, 285/374, 275; 137/801; 239/587.5
See application file for complete search history.

(56) References Cited

U.S. PATENT DOCUMENTS

| 2,159,150 | A | * | 5/1939 | Heintz ........................ | 285/277 |
| 2,646,998 | A | * | 7/1953 | Scheiwer .................... | 285/277 |
| 3,164,400 | A | * | 1/1965 | Weaver ....................... | 285/114 |
| 3,480,302 | A | * | 11/1969 | Teague et al. ............... | 285/400 |
| 4,037,624 | A | * | 7/1977 | Turner et al. ................ | 137/801 |
| 4,163,573 | A | * | 8/1979 | Yano ........................... | 285/276 |

(Continued)

FOREIGN PATENT DOCUMENTS

| EP | 0476402 | 3/1992 |
| GB | 529817 | 11/1940 |
| GB | 978461 | 12/1964 |

OTHER PUBLICATIONS

International Search Report related to PCT/NL2009/050746 and Written Opinion, mailed on Mar. 31, 2010.

(Continued)

*Primary Examiner* — David E Bochna
(74) *Attorney, Agent, or Firm* — De Vries & Metman

(57) ABSTRACT

A conduit structure provided with a rotation coupling comprises a first hose part (1) with a first coupling part (4) at an end thereof, and furthermore a second coupling part (5) at an end of a further part (6, 15; 2, 4, 19). The first coupling part can be inserted into the second coupling part and the coupling parts are provided with a separate sealing element (9) as well as with locking means (17, 18), such that the first and the second coupling part are rotatably but non-slidably coupled. The first hose part (1) extends through and some distance beyond the first coupling part (4) and in the coupled condition the sealing element (9) seals the space between the portion of the first hose part that extends beyond the first coupling part and the second coupling part (5).

15 Claims, 3 Drawing Sheets

U.S. PATENT DOCUMENTS

| | | | | |
|---|---|---|---|---|
| 4,453,747 A * | 6/1984 | Bimba | .......................... | 285/403 |
| 4,591,194 A * | 5/1986 | Tash | .............................. | 285/256 |
| 4,685,705 A * | 8/1987 | Jones | ............................ | 285/374 |
| 5,116,086 A * | 5/1992 | Psajd | ............................ | 285/277 |
| 5,277,454 A | 1/1994 | Lorch et al. | | |
| 5,351,999 A * | 10/1994 | Hattori | .......................... | 285/374 |
| 5,871,029 A | 2/1999 | Peteri et al. | | |
| 5,992,898 A * | 11/1999 | Saylor | ........................... | 285/276 |
| 6,062,605 A * | 5/2000 | Goshima et al. | ............. | 285/276 |
| 6,068,303 A * | 5/2000 | Hollnagle | .................... | 285/374 |
| 6,106,027 A | 8/2000 | Mulvey et al. | | |
| 6,991,265 B2 * | 1/2006 | Walmsley et al. | ............ | 285/374 |
| 7,611,170 B2 * | 11/2009 | Hillhouse | .................... | 285/276 |
| 8,176,612 B2 * | 5/2012 | Levy | ............................... | 285/256 |
| 8,186,375 B2 * | 5/2012 | Andersen et al. | ............. | 285/276 |
| 2003/0137896 A1 | 7/2003 | Spiegel | | |
| 2007/0176419 A1 | 8/2007 | Taillon | | |
| 2007/0289648 A1 | 12/2007 | Knapp | | |
| 2011/0278835 A1 * | 11/2011 | Kishi et al. | .................... | 285/403 |

OTHER PUBLICATIONS

Machine translation of the relevant parts of DE 8501282.
Chinese Office Action, mailed Mar. 5, 2013 in connection with Chinese Patent Application No. 200980148474.8.

\* cited by examiner

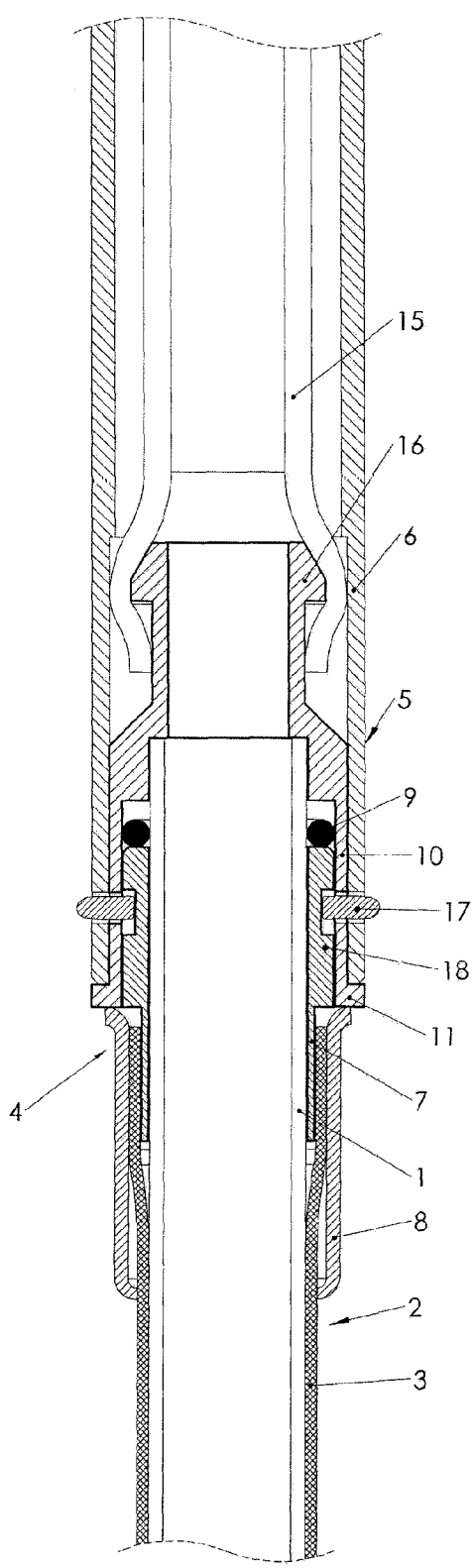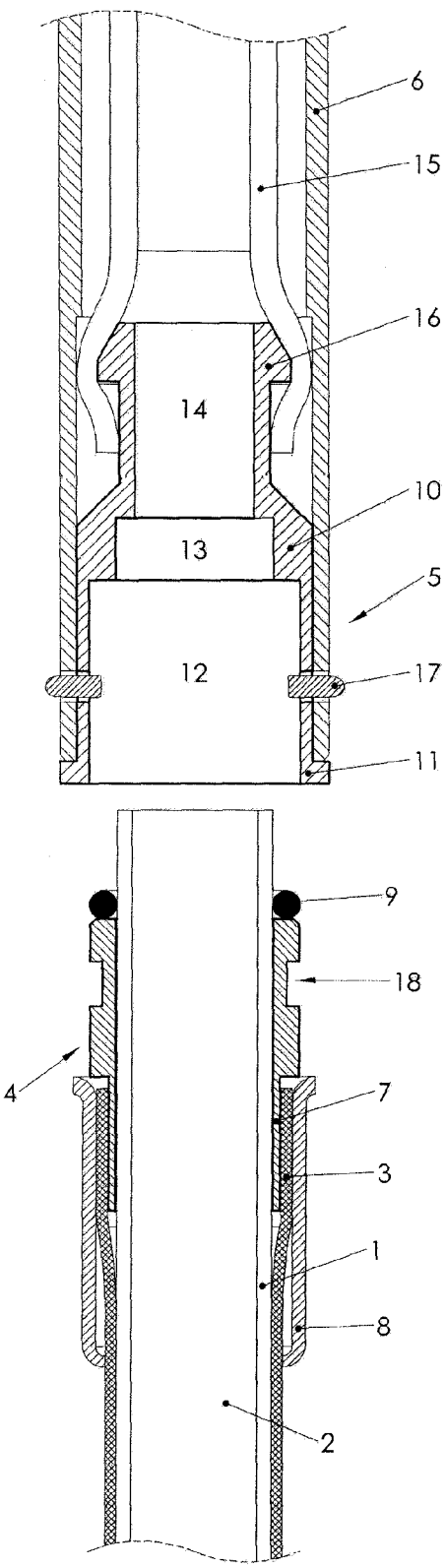
Fig. 1
Fig. 2

CONDUIT STRUCTURE FOR A HOT WATER TAP, AS WELL AS SUCH TAP

PRIORITY CLAIM TO RELATED APPLICATIONS

This application is a national stage application under 35 U.S.C. §371 of PCT/NL2009/050746, filed Dec. 8, 2009, published as WO 2010/068097 A1 on Jun. 17, 2010, and claiming priority to Dutch Application No. NL2002303, filed Dec. 8, 2008, which application and publication is incorporated herein by reference and made a part hereof in its entirety, and the benefit of priority of which is claimed herein.

SUMMARY

The invention relates to a conduit structure provided with a rotation coupling for use with a hot water tap, comprising a first hose part with a separate first coupling part at an end thereof, and furthermore a second coupling part at an end of a further part, which first coupling part can be inserted into the second coupling part and which coupling parts are provided with a separate sealing element as well as with locking means, such that the first and the second coupling part are rotatably but non-slidably coupled.

Such a conduit structure is known, for example from the present applicant's European patent EP 0 792 970 B1. In said known structure, the first coupling part comprises a pipe-shaped portion, which extends into the first hose part, whilst the first hose part is clamped down on said pipe-shaped portion by a clamping element. The other portion of the coupling part is disposed in the second coupling part and is provided with the sealing element at the outer side for forming a seal between the first and the second coupling part.

The drawback of said structure is that the liquid flowing through the conduit structure comes into contact with the first coupling part. Said first coupling part is usually made of a metal, such as brass, which may exhibit an undesirable interaction with the liquids to be passed therethrough. Water of a high temperature (around 100° C.), for example, can easily cause dissolved calcium to precipitate on metal surfaces, whilst acidic or alkaline solutions can affect metal surfaces. Also an internal diameter reduction between the first hose part and the first coupling part inserted therein may lead to undesirable effects, such as calcium precipitation.

One of the objects of the present invention is to eliminate or at least alleviate the above drawbacks.

In order to accomplish that object, the conduit structure provided with a rotation coupling is characterised in that the first hose part extends through and some distance beyond the first coupling part and in that in the coupled condition the sealing element seals the space between the portion of the first hose part that extends beyond the first coupling part and the second coupling part.

In the conduit structure according to the invention, the first hose part extends through the first coupling part, so that the first coupling part is screened from the liquid flowing through the conduit structure. In this way, there is no transition between the first hose part and the first coupling part. Since the sealing element seals directly on the first hose part, a seal is required only between the first hose part and the second coupling part and no longer between the first hose part and the first coupling part. This reduces the risk of leakages, in addition to the advantages of an improved guidance of the liquid and the prevention of interaction between the first coupling part and the liquid.

Preferably, the sealing element is provided on the first hose part, and the aforesaid space is externally bounded by a portion of the second coupling part that connects to a free end thereof without a diameter reduction, so that the sealing element can be readily introduced into the second coupling part. It is advantageous if the sealing element comprises an O-ring as a simple but nevertheless effective sealing element.

If the second coupling part comprises a socket, preferably made of plastic material, which extends around the sealing element and at least part of the first coupling part in the coupled condition, the second coupling part is screened from the liquid as well, so that said second coupling part can also be made of a metal without any problem.

It is advantageous in that regard if a flexible second hose part is connected to said socket, whilst preferably said socket and said second hose part are accommodated in a pipe, such as a tap spout, with the second hose part being moved onto the socket and being clamped between the socket and the pipe so as to form a seal between the socket and the second hose part.

In this way a further hose part can be connected to the socket without a further seal being required, whilst a proper seal is nevertheless ensured. It is advantageous in that regard if the first hose part connects to an adjoining part of the conduit structure without a transition.

In an embodiment in which the first hose part forms an inner tube of a hose comprising the inner tube and a sheath arranged around said inner tube, for example a metal mesh, it is advantageous if the first coupling part comprises a thin-walled pipe-shaped portion, which is disposed between the sheath and the inner tube extending beyond said sheath, whilst preferably a clamping element clamps the sheath down on the pipe-shaped portion.

Using such a structure, the first coupling part can be readily arranged round the first hose part, whilst the clamping fixation takes place between the pipe-shaped portion of the first coupling part and the sheath, which is advantageous in comparison with the prior art, in which the inner tube is clamped down on the first coupling part. After all, the frictional force between the first coupling part and the sheath will in most cases be higher than between the coupling part and the inner tube, which is in many cases made of PTFE or another smooth plastic. Accordingly, a lower clamping force is required for realising a secure fixation.

The invention also relates to a rotation coupling for use in the conduit structure described in the foregoing, and also to a tap comprising such a conduit structure.

BRIEF DESCRIPTION OF THE DRAWINGS

The invention will be explained in more detail below with reference to a drawing, which shows a number of embodiments of the invention.

FIG. 1 is a longitudinal sectional view of a first embodiment of a conduit structure according to the invention in the assembled condition thereof.

FIG. 2 is a sectional view corresponding to FIG. 1 of the conduit structure, in which the first and the second coupling part are disconnected from each other.

DETAILED DESCRIPTION

Figure 3:
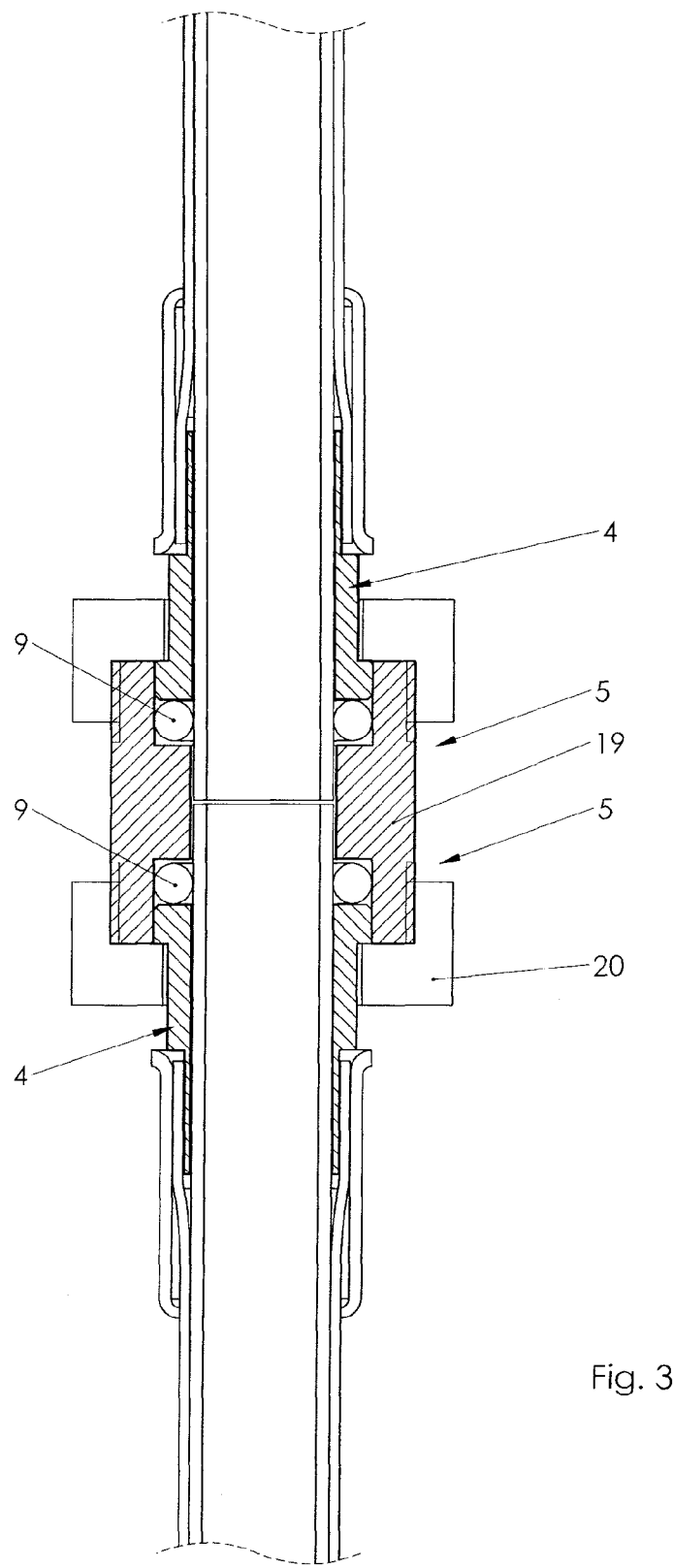
FIGS. 3 and 4 are schematic sectional views corresponding to FIG. 1 of a second and a third embodiment of the conduit structure according to the invention.

The drawings, and in the first place FIGS. 1 and 2 thereof, show a conduit structure with a rotation coupling, which can be used in a tap according to European patent EP 0 792 970 B1, for example, whose contents are incorporated herein by reference thereto.

The conduit structure of this embodiment comprises a first hose part 1, which in this case is configured as an inner tube of a flexible hose 2 made up of said inner tube 1 surrounded by a sheath 3, for example of a metal, in particular stainless steel, mesh or the like, as is known in the art. The inner tube 1 may be made of PTFE or another suitable plastic. Provided near the end of the hose 20 is a first coupling part 4 is, which can mate with a second coupling part 5, which in this embodiment forms part of another part, in this case a tap spout 6.

As is shown in FIGS. 1 and 2, the first hose part 1 in the form of the inner tube extends beyond the end of the sheath 3, and the first hose part extends through the first coupling part 4 and also some distance beyond the first coupling part 4.

In this embodiment, the connection of the first coupling part 4 to the hose 2 takes place in that the first coupling part 4 comprises a thin-walled pipe-shaped portion 7, which is moved between the inner tube 1 and the sheath 3, and which is clampingly connected to the sheath 3 by means of a clamping element 8, so that the coupling part 4 is firmly connected to the hose 2, without any transition in the conduit, because the inner tube 1 continues without interruption to beyond the first coupling part 4. The provision of a separate seal between the first coupling part 4 and the first hose part 1 is not necessary, therefore. A seal is only present between the outer side of the inner tube 1 and the surrounding portion of the second coupling part 5. In the illustrated embodiment, an O-ring 9 is provided as a sealing element in the space between the inner tube 1 and the coupling part 2.

In the illustrated embodiment, the second coupling part 5 is provided with a plastic socket 10, which is accommodated in the metal pipe of the tap spout 6 and which surrounds the portion of the inner tube 1 that extends outside the first coupling part 4 and a portion of the first coupling part 4, so that the O-ring 9 abuts with a certain bias both against the inner side of the socket 10 and against the outer side of the inner tube 1, forming a seal thereon. The socket 10 is provided with an external collar 11, via which the socket 10 can be positioned relative to the tap spout 6. The socket 10 furthermore has a stepped configuration on the inner side, comprising a first portion 12 having the largest internal diameter, in which the first coupling part 4 and the O-ring 9 are accommodated, a second portion 13 having a smaller diameter, in which the portion of the inner tube 1 beyond the O-ring 9 fits, and a third portion 14, whose diameter at least substantially corresponds to the internal diameter of the inner tube 1 and which consequently forms a connecting passage of the conduit structure.

A flexible second hose part 15 is connected to the socket 10. The socket 10 is to that end provided with a push-on collar 16, onto which the lower end of the second hose part 15 can be moved while being stretched, so that a strong connection is obtained. The internal diameter of the tap spout 6 at the location of the push-on collar 16 is such that the outer side of the second hose part 15 clamps against the inner side of the tap spout 6 at the location of the push-on collar 16, so that a proper seal between the push-on collar 16 of the socket 10 and the second hose part 15 is effected and consequently an additional sealing element is not needed.

The first and the second coupling part 4, 5 are further provided with locking means, in this case consisting of a stainless steel clamping spring 17, which extend through openings in the tap spout 6 and the socket 10, projecting internally from the socket 10. The clamping spring 17 can thus engage in a circular groove 18 in the outer side of the first coupling part 4, as a result of which the first coupling part 4 with the hose connected thereto is locked in axial direction relative to the second coupling part 5, possibly with some play. The hose 2 can rotate relative to the second coupling part 5 though, with the inner tube 1 and the coupling part 4 rotating relative to the socket 10 and the clamping spring 17. The O-ring 9 can rotate relative to the inner tube as well as to the socket, whilst continuing to provide a proper seal against the outer side of the inner tube 1 and against the inner side of the socket 10. Thus, a continuous tube of plastic material is provided in every rotary position, in which the extent to which diameter transitions occur is minimised and which is sealed in a reliable manner.

FIG. 3 shows another embodiment, in which the first hose part 1 and the parts attached thereto have the same configuration as in FIGS. 1 and 2. In this case, however, the second coupling part 6 makes up half of a coupling sleeve 19, which in fact comprises two second coupling parts 5 for connecting two first coupling parts 4, such that two first hose parts 1 abut with their end faces. Consequently, a symmetrical (double) rotation coupling between two hoses 2 is formed. The coupling sleeve 19 is preferably made of plastic material, such as POM, and is provided with a union nut 20 or the like, which can be screwed with its internal screw thread on external screw thread on the ends of the coupling sleeve 19. The pipe-shaped portion of the first coupling parts 4 is passed through the opening of the union nut 20, but it engages the other portion of the coupling part 4 in question, so that said coupling part is locked in axial direction in the coupling sleeve 19 whilst continuing to be rotatable relative to the coupling sleeve 19, and consequently relative to the associated second coupling part 5. In this way a symmetrical rotation coupling is obtained. It suffices, though, if one of the two coupling parts 4 is rotatable relative to the coupling sleeve 19.

Figure 4:
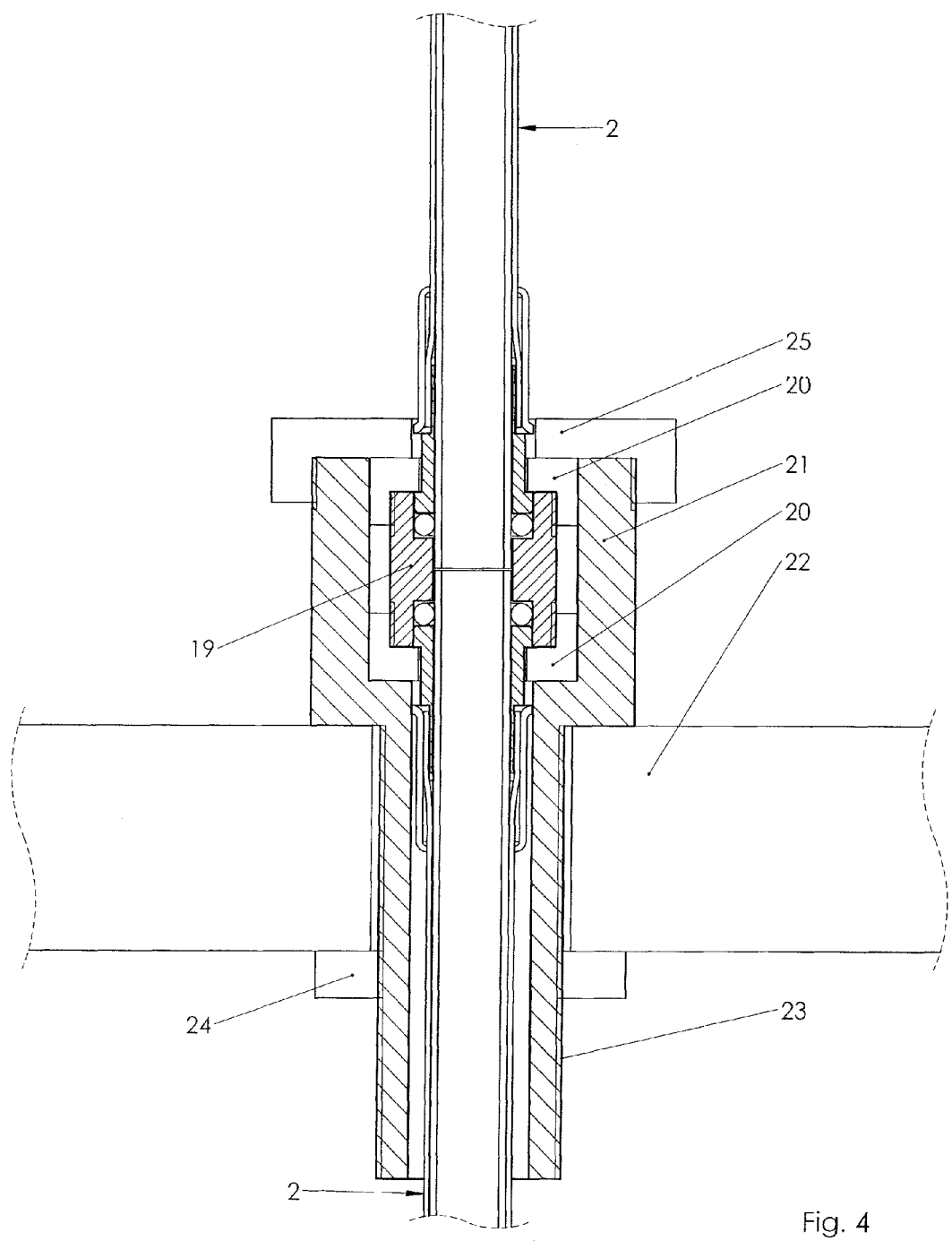

FIG. 4 shows a variant of the embodiment of FIG. 3, in which the symmetrical rotation coupling is accommodated in a mounting tube 21, which is fixed to a kitchen worktop 22 near the bottom side. The tube 21 is to that end provided with external screw thread 23, on which a retaining nut 24 can be screwed. The symmetrical rotation coupling, retained by the union nuts 24, is inserted into the upper part of the mounting tube with a proper fit and is retained by the union nut 25. Both the lower hose 2 under the worktop and the upper hose 2 (to which a kitchen sink shower may be connected) can rotate relative to the coupling sleeve 19 and the mounting tube 21, respectively. If the lower hose need not be rotatable, the coupling according to FIG. 4 may also be provided with a suitable fixed gasket rather than with the lower O-ring.

The invention as described in the foregoing provides a conduit structure with a rotation coupling which offers various advantages over the prior art:
- as a result of the use of the continuous plastic conduit there will no longer be any contact between water and metal parts of the coupling parts, and precipitation of calcium or other interaction with the metal can no longer take place,
- as a result of said reduced precipitation of calcium, the through-flow in the conduit will remain optimal and attack of metal parts, for example caused by dezincification or corrosion, can no longer take place,
- the water cannot become contaminated by released metals or metal oxides,
- there will no longer be a constriction in the conduit at the location of the connection of the rotation coupling, which also contributes to a proper through-flow,
- the rotation coupling according to the invention is simpler and more reliable than a conventional rotation coupling, the rotation coupling according to the invention encounters less friction upon rotation, because the friction between the O-ring and the plastic retaining surfaces is lower than the friction between an O-ring and metal bearing surfaces.

The invention is not limited to the embodiments as shown in the drawing and described in the foregoing, which can be varied within the scope of the invention. Thus, the rotation coupling can be utilised for all kinds of other types of hoses and flexible pipes. The conduit structure can also be used for transporting liquids other than (hot) water. The materials of the various parts can be selected in dependence on the intended use.

The invention claimed is:

1. A tap, provided with a conduit structure, wherein said conduit structure is provided with a rotation coupling, said conduit structure comprising a first hose part with a separate first coupling part at an end thereof, and furthermore a second coupling part at an end of a further part, which first coupling part can be inserted into the second coupling part and which coupling parts are provided with a separate sealing element as well as with locking means, such that the first and the second coupling part are rotatably but non-slidably coupled,
wherein the first hose part extends through and some distance beyond the first coupling part,
wherein, in the coupled condition, the sealing element seals the space between the portion of the first hose part that extends beyond the first coupling part and the second coupling part, and
wherein the second coupling part forms part of a tap spout.

2. The tap according to claim 1, wherein the second coupling part comprises a socket, which extends around the sealing element and at least portion of the first coupling part in the coupled condition, and wherein the socket is made of plastic material.

3. The tap according to claim 1, wherein the second coupling part comprises a socket, which extends around the sealing element and at least portion of the first coupling part in the coupled condition, and wherein the socket has a stepped configuration on the inner side, comprising a first portion having the largest internal diameter, which bounds the aforesaid space sealed by the sealing element, a second portion having a smaller diameter, in which the end of the projecting first hose part fits, and a third portion, whose diameter at least substantially corresponds to the internal diameter of the second hose part.

4. The tap according to claim 1, wherein the sealing element is provided on the first hose part, and said space is externally bounded by a portion of the second coupling part that connects to a free end thereof without a diameter reduction.

5. The tap according to claim 1, wherein the sealing element comprises an O-ring.

6. The tap according to claim 1, wherein the second coupling part comprises a socket, which extends around the sealing element and at least portion of the first coupling part in the coupled condition.

7. The tap according to claim 6, wherein a flexible second hose part is connected to the socket.

8. The tap according to claim 1, wherein the locking means can be unlocked for detaching the first hose part with the first coupling part from the second coupling part.

9. The tap according to claim 8, wherein said locking means are provided with one of a clamping spring and a union nut.

10. The tap according to claim 1, wherein said further part comprises a symmetrical coupling with a further second coupling part for connecting a further first coupling part of a hose.

11. The tap according to claim 1, wherein the first hose part connects to an adjoining portion of the conduit structure without a transition.

12. The tap according to claim 1, wherein the first hose part forms an inner tube of a hose comprising said inner tube and a sheath arranged around said inner tube.

13. A conduit structure provided with a rotation coupling, comprising:
a first hose part with a separate first coupling part at an end thereof, and furthermore a second coupling part at an end of a further part, which first coupling part can be inserted into the second coupling part and which coupling parts are provided with a separate sealing element as well as with locking means, such that the first and the second coupling part are rotatably but non-slidably coupled;
wherein the first hose part extends through and some distance beyond the first coupling part and wherein in the coupled condition the sealing element seals the space between the portion of the first hose part that extends beyond the first coupling part and the second coupling part;
wherein the second coupling part comprises a socket, which extends around the sealing element and at least portion of the first coupling part in the coupled condition;
wherein a flexible second hose part is connected to the socket;
wherein the socket and said second hose part are accommodated in a pipe, with the second hose part being moved onto the socket and being clamped between the socket and the pipe so as to form a seal between the socket and the second hose part.

14. A conduit structure provided with a rotation coupling, comprising:
a first hose part with a separate first coupling part at an end thereof, and furthermore a second coupling part at an end of a further part, which first coupling part can be inserted into the second coupling part and which coupling parts are provided with a separate sealing element as well as with locking means, such that the first and the second coupling part are rotatably but non-slidably coupled;
wherein the first hose part extends through and some distance beyond the first coupling part and wherein in the coupled condition the sealing element seals the space between the portion of the first hose part that extends beyond the first coupling part and the second coupling part;
wherein the first hose part forms an inner tube of a hose comprising said inner tube and a sheath arranged around said inner tube;
wherein the first coupling part comprises a thin-walled pipe-shaped portion, which is disposed between the sheath and the inner tube extending beyond said sheath.

15. The conduit structure according to claim 14, wherein a clamping element clamps the sheath down on the pipe-shaped portion.

\* \* \* \* \*